United States Patent [19]

Kamikawa et al.

[11] Patent Number: 4,952,057
[45] Date of Patent: Aug. 28, 1990

[54] OPTICAL FIBER BACKSCATTER SIGNATURE GENERATOR (OFBSG)

[75] Inventors: Neil Kamikawa, Kaneohe; Arthur Nakagawa, Kailua; Grant Tanaka, Aiea; Ken Yamada, Honolulu, all of Hi.

[73] Assignee: The United States of America as represented by the Secretary of the Navy, Washington, D.C.

[21] Appl. No.: 350,172

[22] Filed: May 3, 1989

[51] Int. Cl.$^5$ .................. G01N 21/84; G01N 21/88
[52] U.S. Cl. .................................................. 356/73.1
[58] Field of Search ........................................ 356/73.1

[56] References Cited

U.S. PATENT DOCUMENTS

| | | | |
|---|---|---|---|
| 4,289,398 | 9/1981 | Robichaud | 356/73.1 |
| 4,497,575 | 2/1985 | Philipp | 356/73.1 |
| 4,685,799 | 8/1987 | Brininstool | 356/73.1 |
| 4,708,471 | 11/1987 | Beckmann et al. | 356/73.1 |
| 4,732,469 | 3/1988 | Souma | 356/73.1 |
| 4,743,753 | 5/1988 | Cheng et al. | 356/73.1 X |

Primary Examiner—Vincent P. McGraw
Attorney, Agent, or Firm—Harvey Fendelman; Thomas Glenn Keough

[57] ABSTRACT

The optical fiber backscatter signal generator (OFBSG) generates simulated optical fiber backscatter waveform signals that are used to characterize or calibrate an optical time-domain reflectometer (OTDR). An OTDR is a commercially available test instrument that measures loss and length of a fiber optic cable by launching an optical signal into the cable and measuring the power that is reflected back (backscattered) into the OTDR. The OFBSG device creates a simulated optical fiber backscattered signal of a virtual cable and couples this signal into the OTDR so that length accuracy, loss accuracy, and dynamic range of the OTDR can be determined. An electrooptical section, a signal generator section and a microprocessor section that is programmable to simulate a variety of cable anomalies, provide adaptability to accommodate a wide variety of OTDRs and, by reason of its sound engineering design, it is capable of being used under adverse conditions such as those encountered in the field.

4 Claims, 13 Drawing Sheets

4,952,057

OPTICAL FIBER BACKSCATTER SIGNATURE GENERATOR (OFBSG)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The operation of the optical fiber backscatter generator (OFBSG) is difficult to describe without briefly describing an optical time-domain reflectometer (OTDR) first. An OTDR measures attenuation and locates breaks in a fiber optic cable by detecting optical power that is scattered backwards from forward traveling optical pulses. These short duration pulses are generated by a laser in the OTDR and launched into the cable under test. The backscatter power is caused by Rayleigh scattering or Fresnel reflections. Splice losses, microbends, and breaks can be measured by detecting this backscatter power as a function of "round-trip" time for the pulses to travel into the cable and scatter backwards. The detected power decays exponentially as a function of distance into the cable due to Rayleigh scattering. Looking to FIG. 1a an illustration of OTDR data is presented which shows the measured backscattered power at a wavelength of 1.55 microns from a 50 kilometer long single-mode optical fiber. The backscatter decays exponentially, but is displayed in a linear format in FIG. 1a by taking five times the Logarithm of the backscatter data. The data indicate an attenuation of 0.21 dB per kilometer and show a 0.23 dB splice loss at about 25 kilometers from the beginning of the fiber which is characterized by a discontinuity in the backscattered data. A large Fresnel reflection appears at the end of the fiber.

While, generally speaking, the OTDRs are fabricated to assure long-term reliable life, no practical device instrumentation or technique is known to be available on the market to test, monitor, or otherwise characterize the performance of these OTDRs. As a consequence, it is difficult to determine an optimum OTDR performance level or whether or not an OTDR is still performing satisfactorily.

Several techniques have been proposed in journal publications that utilize passive optical set ups. An apparent disadvantage of these techniques is that no single set up can test all of the different types of OTDRs without extensive modifications.

Thus, a continuing need exists in the state of the art for an optical fiber backscatter signal generator that generates optical signals used to characterize or calibrate an OTDR that is capable of monitoring different OTDRs and has a flexibility to accommodate that various types of OTDRs on the market and which lends itself for automatic testing thereof.

SUMMARY OF THE INVENTION

The present invention is directed to providing an optical fiber backscatter signal generator for measuring the performance of an OTDR. An electro-optic interface is optically coupled to the OTDR and converts the optical signals into representative electrical signals and vice versa. A signal generator is coupled to receive the representative electrical signals and produces a back scatter signature with data stored in a RAM. The backscatter signature may include connector, splice, microbend loss, and other types of fiber anomaly data to create a variety of backscatter signatures. A microprocessor section loads data from an EPROM to the RAM in the signal generator section to thereby simulate a backscatter signature of interest.

A prime object of the invention is to provide an OFBSG for measuring the performance of an OTDR.

Another object is to provide an OFBSG having flexibility to accommodate a variety of OTDRs.

Still another object is to provide an OFBSG which simulates cable backscatter by generating a correct optical waveform to calibrate or otherwise measure the performance of an OTDR.

Yet a further object is to provide an OFBSG which lends itself to representations of not only backscatter attributed to an optical fiber but to simulate splice losses, microbend loss, different connectors and other types of fiber anomalies.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

An issue that arises frequently in the use of an OTDR is its reliability in measuring fiber and splice losses. Reliability and accuracy are essential for those who design, install and service the optical fibers and must know, sometimes under adverse field conditions, whether or not an OTDR is giving accurate readings of fiber condition.

Figure 1A:
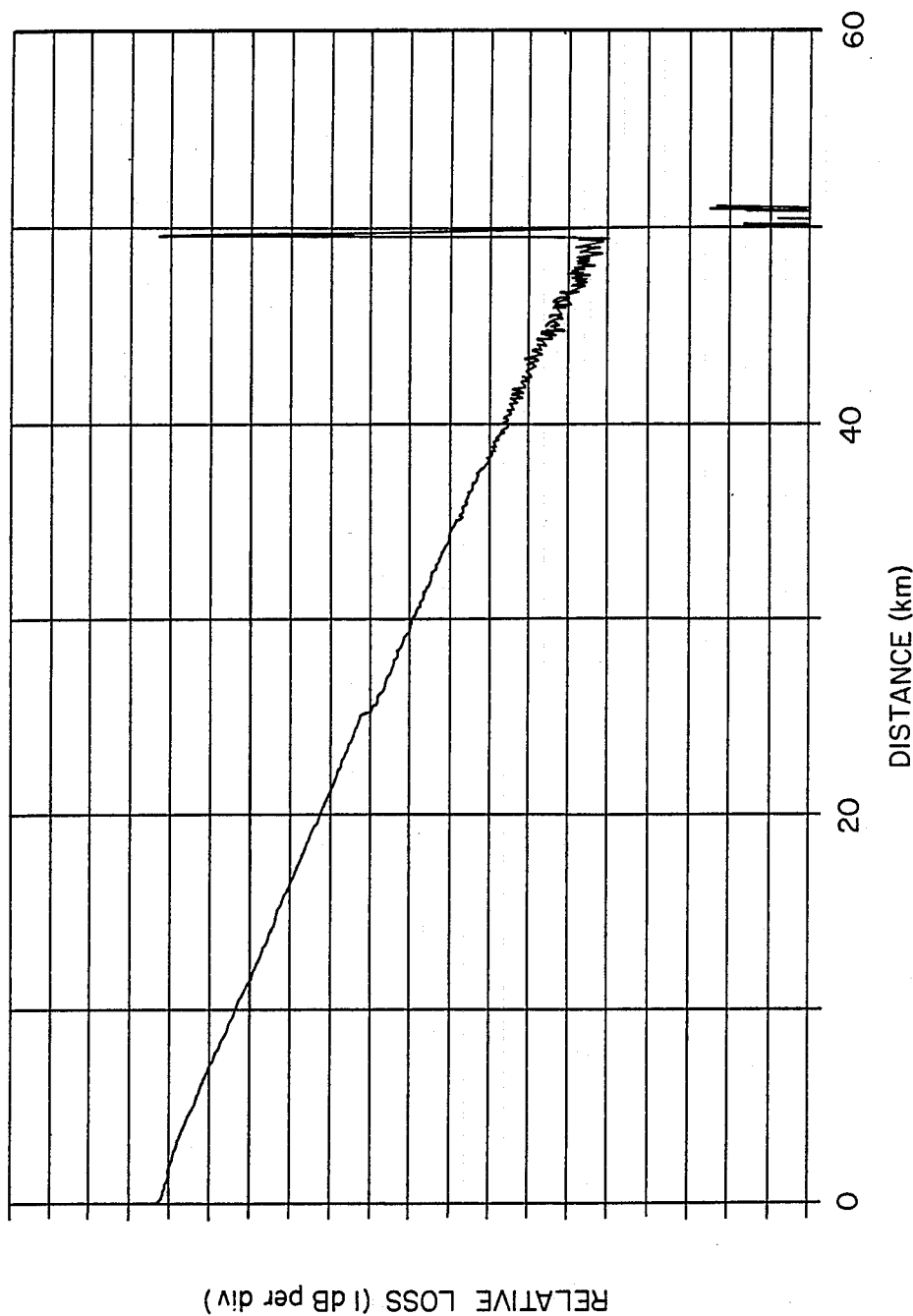
FIG. 1a is an illustration of OTDR data that includes the measured backscattered power at a wavelength of 1.55 microns from a 50 kilometer long single-mode optical fiber.

As referred to above, a typical OTDR readout is shown in FIG. 1a. If this is the waveform monitored, how does a technician or workman know if it is accurate and how small a splice loss can it measure? In addition an OTDR's dynamic range, etc. is left to conjecture so that fiber condition may not be accurately portrayed.

Figure 1B:
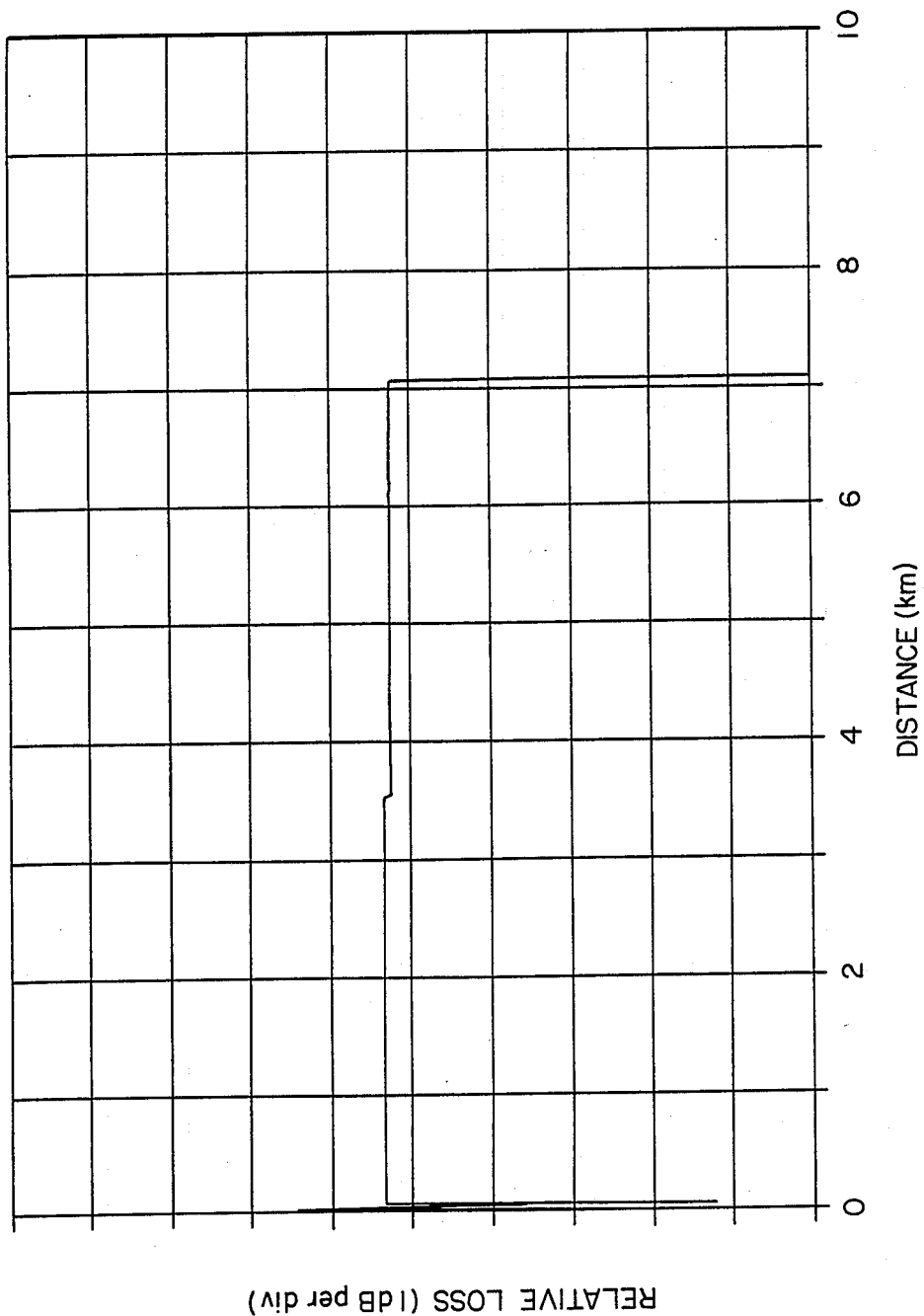
FIG. 1b shows a 0.1 dB splice loss in a 7 kilometer optical fiber that was generated by the OFBSG and measured by an OTDR being tested.

The data represented in FIG. 1b was generated by the optical fiber backscatter signal generator (OFBSG) of this inventive concept. The graph shows a 0.1 dB splice loss in a 7 kilometer long optical fiber. A signal representative of such a splice loss was generated by the OFBSG and coupled to and measured by an OTDR being tested. This capability gives an assured quality control of the test procedure and enables a technician or workman to feel confident that the OTDR he is using provides a true indication of signal condition throughout the fiber that is being installed or repaired. As a consequence, overall reliability of an optical data communication network results since all who work with it know that their test and monitoring instrumentations are functioning properly.

Figure 2:
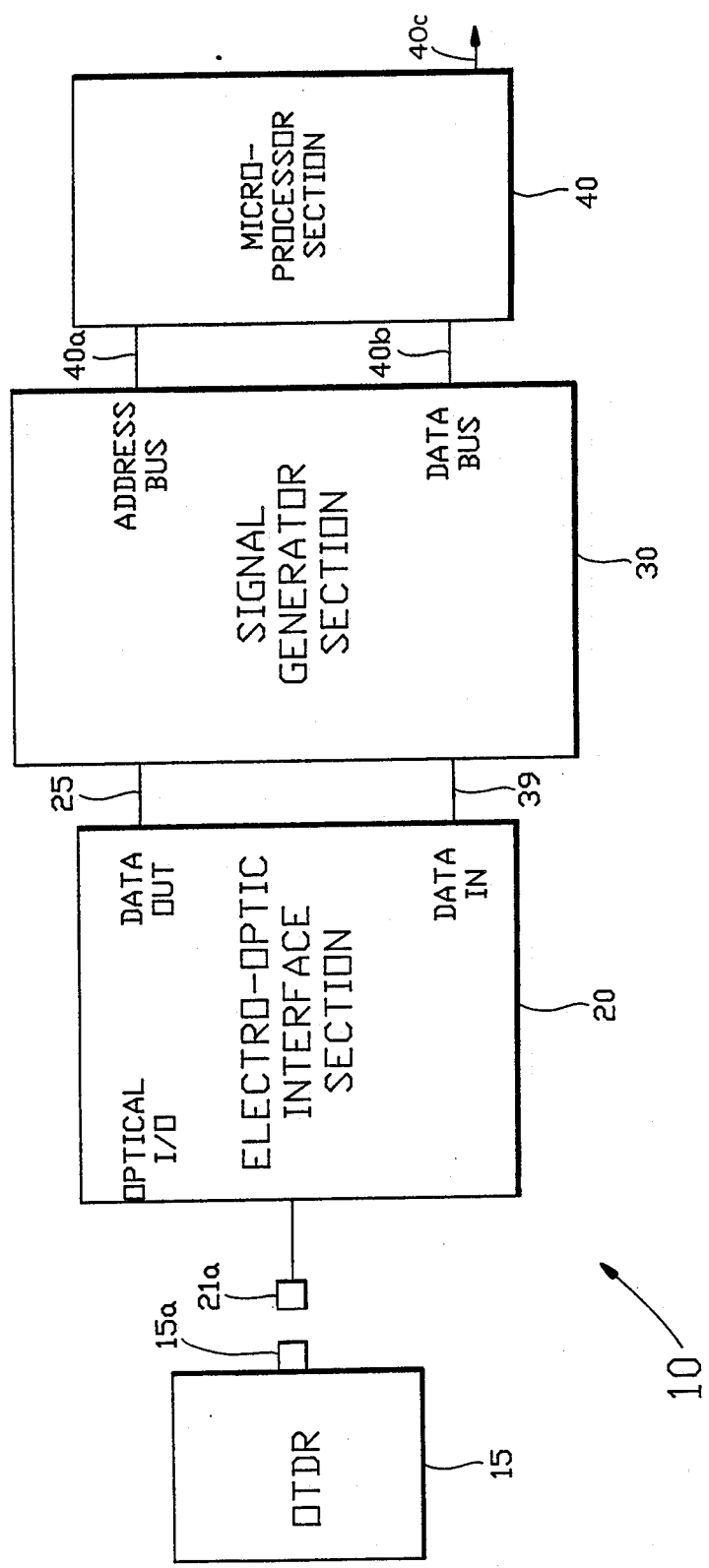
FIG. 2 is a block diagram representation of the three main stages of the invention coupled to an OTDR.

Referring now to FIG. 2, a block diagram representation of the OFBSG 10 is optically coupled to an OTDR 15 to measure its performance. The three main sections of the OFBSG are an electronically interoperative electro-optical interface section 20, an interconnected signal generator section 30 and a microprocessor section 40 coupled to the generator section.

Electro-optic interface section 20 converts optical signals to electrical signals and vice versa. As its name suggests, this interfaces OTDR 15 with the digital circuitry of the OFBSG and enables a responsive testing of the OTDR with the variety of signals that can be produced in the other two sections. While the term optical is used throughout this application, this term is intended also to include infrared and UV wavelengths.

Signal generator section 30 is the part of the OFBSG which produces the desired backscatter signature. Because of the constituent components to be elaborated on below, the content of the backscatter signature may be varied to contain connector, splice, microbend loss or any other type of fiber anomaly which may be found desirable to portray. In practice, due to the inherent capabilities of this section when operatively coupled to the others, the signature types are limited only by a designer or technician's imagination.

Microprocessor section 40 functions to provide loading of control or instruction data from this section to signal generator section 30. Actuation of this sequence creates an accurate and timely generation of a desired backscatter signature in a manner to be discussed below.

Figure 3:
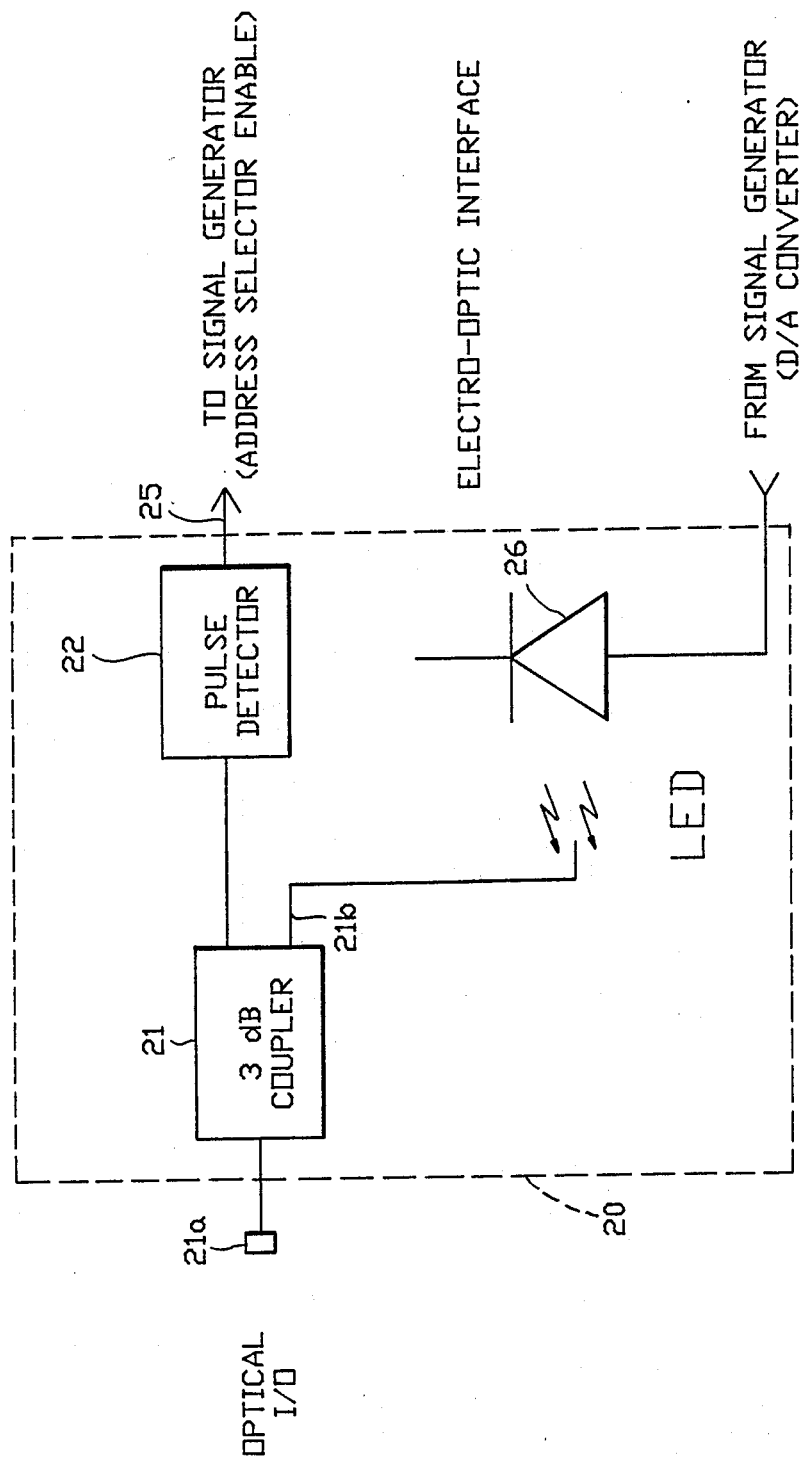
FIG. 3 depicts in greater detail the constituents of the electro-optic interface.

Looking to FIG. 3, electro-optic interface section 20, as its name suggests, functions as an interface between OTDR 15 and the other sections of this invention. A 3 dB coupler 21 has an input port 21a optically coupled to an optically mating port 15a on the OTDR. The OTDR and 3 dB coupler ports feed optical pulses generated by a laser in the OTDR to the OFBSG. These pulses, having widths in the nanosecond to microsecond range and repetition rates in the kilohertz range, are coupled through the 3 dB fiber coupler into a pulse detector circuit 22 that is used to synchronize the OFBSG digital circuitry to the OTDR. Synchronization of the OFBSG to the OTDR is accomplished by converting the OTDR's optical timing pulses to electrical timing pulses for the OFBSG. This is performed by PIN diode 23 which transforms the optical pulses into electrical pulses that are fed to a comparator circuit which includes an appropriately connected operational amplifier 24. After the conversion, the representative electrical pulses are amplified to TTL levels via the comparator, operational amplifier 24 and associated components and passed along through a data out lead 25 to signal generator section 30.

A light emitting diode 26 also is included in electrooptic interface section 20 to convert electrical signals into representative optical signals or photons of energy. The electrical signals are the simulated backscatter signals that have been generated in signal generator section 30. The converted optical signals coming from the LED are coupled to the OTDR via a port 21b in 3 dB fiber coupler 21. This optical signal may be said to appear as a virtual cable signal containing the simulated splices or microbends.

Figure 4:
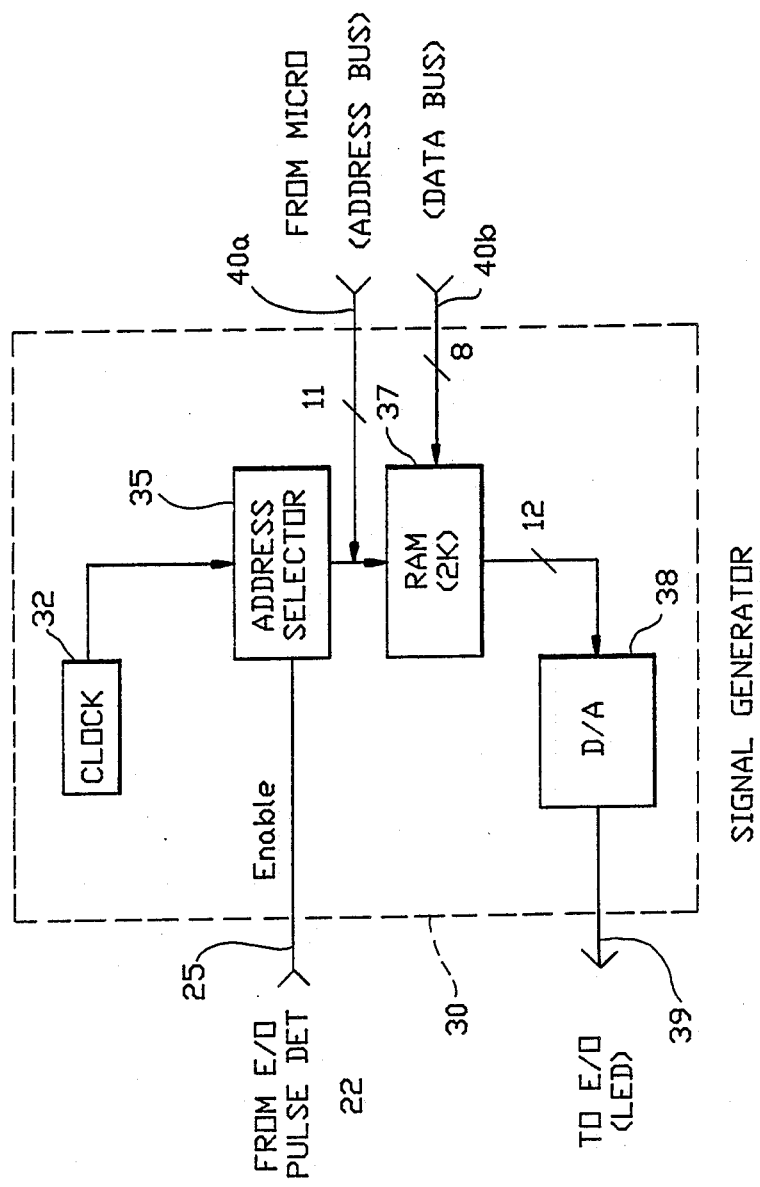
FIG. 4 is a block diagram representation of the details of the signal generator.

FIG. 4 shows that signal generator section 30 is made up of four main functions. Each is designated by an appropriate block which identifies a clock 32, an address selector 35, a random access memory (RAM) 37 and a digital-to-analog section 38.

Clock 32 is used to set the speed of the system. The clock has two modes of operation, enabled and disabled, and three speeds, 20 MHz, 10 MHz and 5 MHz. The modes of operation are triggered by pulse detector 22 that are responsive to the laser pulses from OTDR 15. The clock speeds are controlled by appropriate signals at 33a and 33b of the IC 74LS153 shown in the detailed schematic of clock 32.

Figure 5:
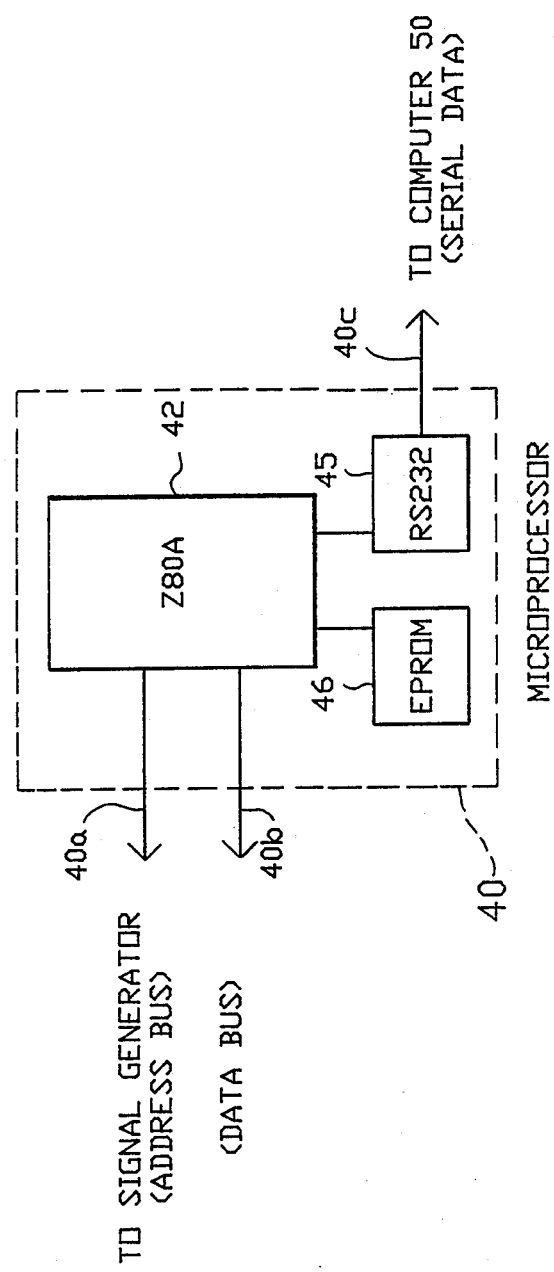
FIG. 5 is an elaboration of the parts of the microprocessor.

Noting FIG. 5, microprocessor section 40 organizes the location of simulated waveforms representative of splices, microbends or other anomalies in a virtual cable by accessing the entries of a look-up table in a programmed timed sequence and sending these entries to digital-to-analog converter 38 via RAM 37. As will be explained in greater detail below, the waveform simulation of splices, microbends or other anomalies in the virtual cable represented by the OFBSG is accomplished by storing digitized signals in the look-up table that corresponds to backscatter power levels in a particular cable that it is desired to portray. The digital-to-analog converter converts the digital signals to analog voltages which are fed to LED 26 via signal generator section output lead 39. These analog signals fed to the LED produce an simulated waveform optical signal which is proportional to the current.

Whenever an optical pulse is received from detector 22 of electro-optic interface section 20, the clock mode of clock 32 is enabled. The clock mode is disabled after all data in RAM 37 has been sent to digital-to-analog circuit 38. Because the simulated waveform has been predetermined to have 2048 kilobytes of data points to accurately portray a desired simulated waveform, the rate at which this data is outputted is determined by the clock speed of clock 32. A faster clock speed of clock 32 will simulate a shorter simulated cable length signal since data will be accessed and shifted out 3 icker. While the 20, 10 and 5 MHz speeds have been identified above, it will be obvious to those skilled in this pertinent art that greater or lesser speeds can easily be relied upon and suitably provided for within the scope of this inventive concept.

Figure 6:
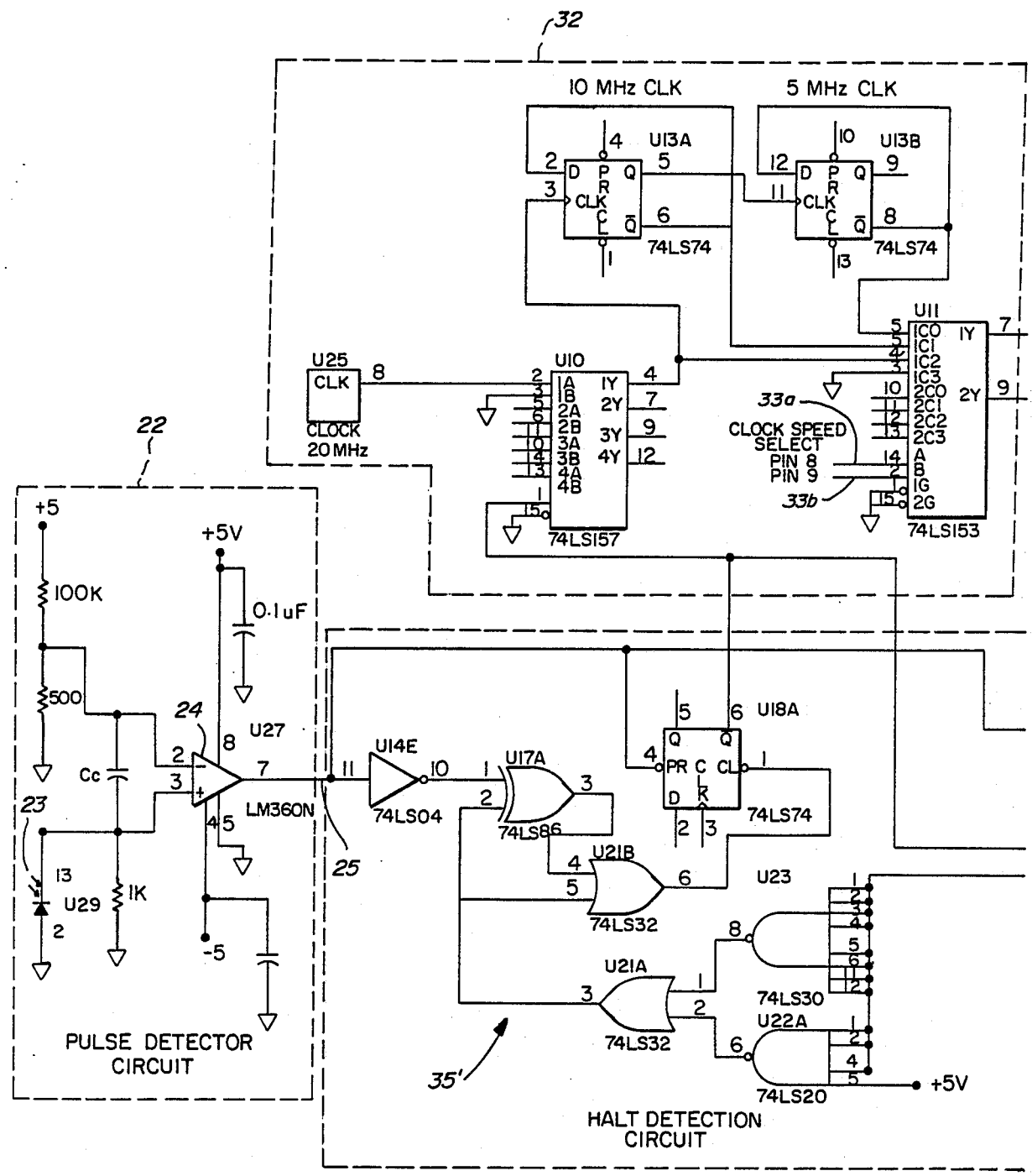
FIGS. 6 through 9 are circuit diagrams of the part of the electro-optic interface section and the signal generator section.
Figure 6:
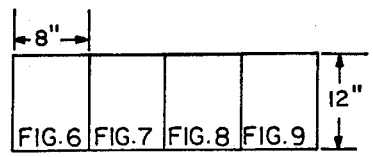
Figure 7:
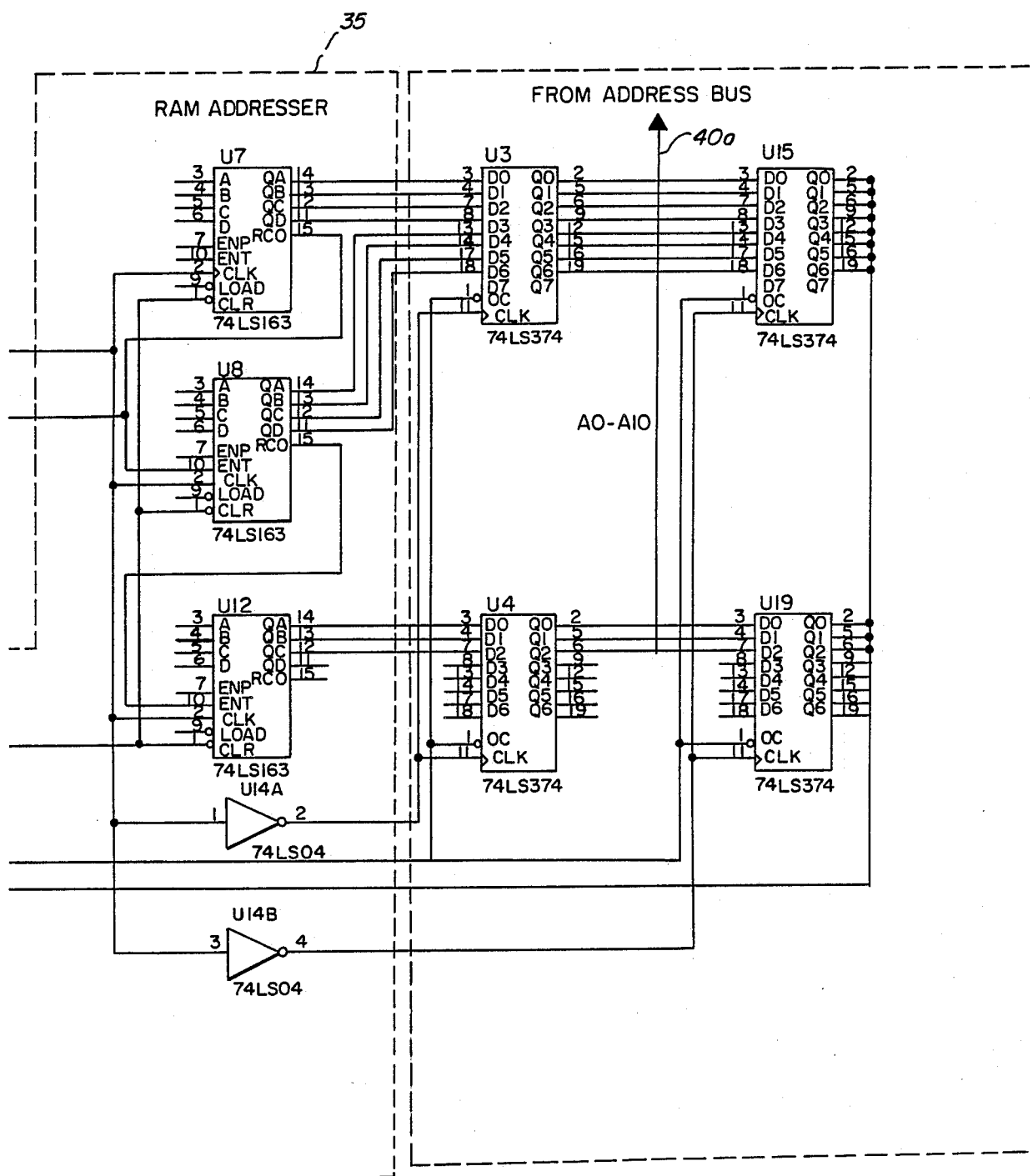
Figure 8:
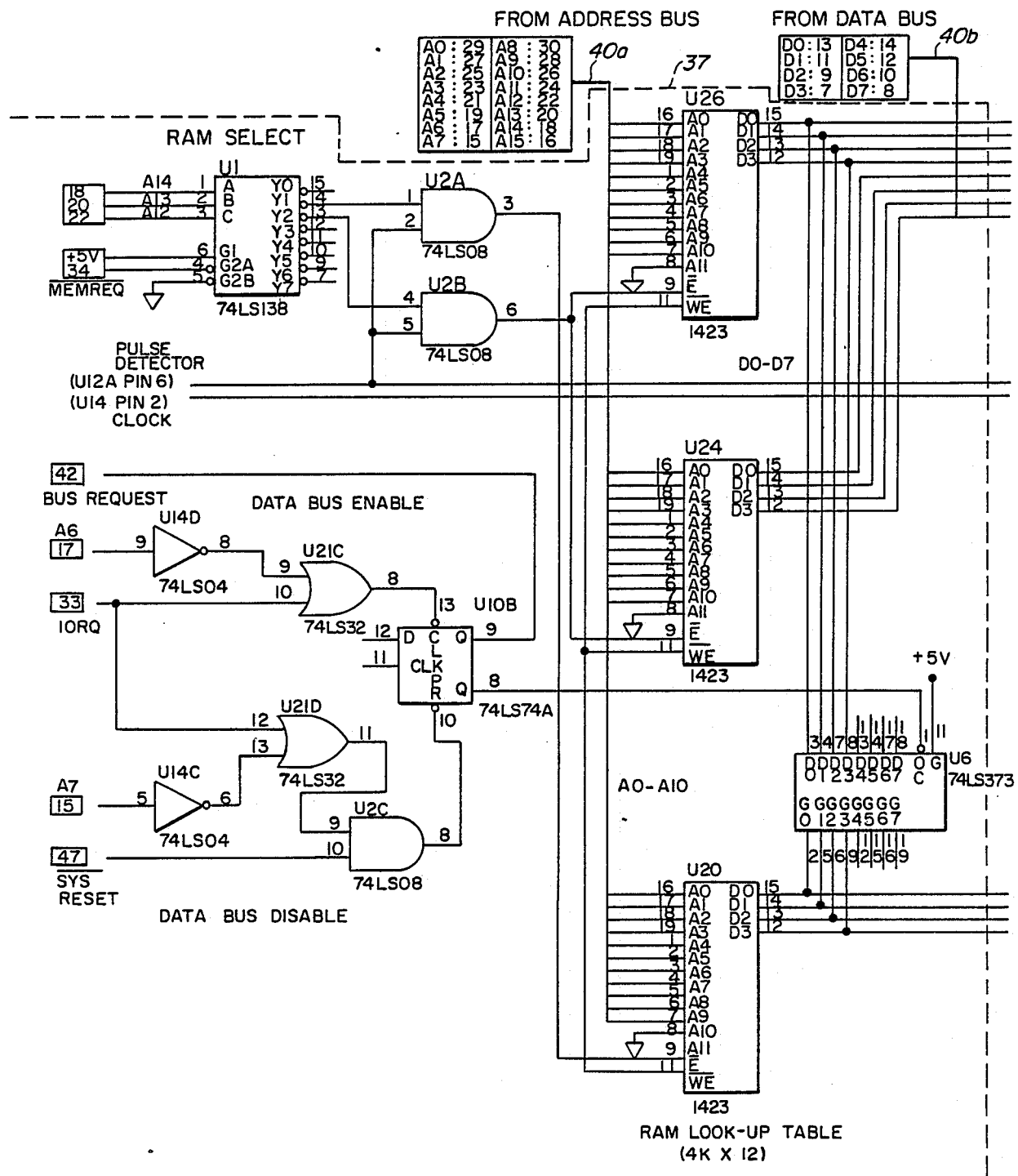
Figure 9:
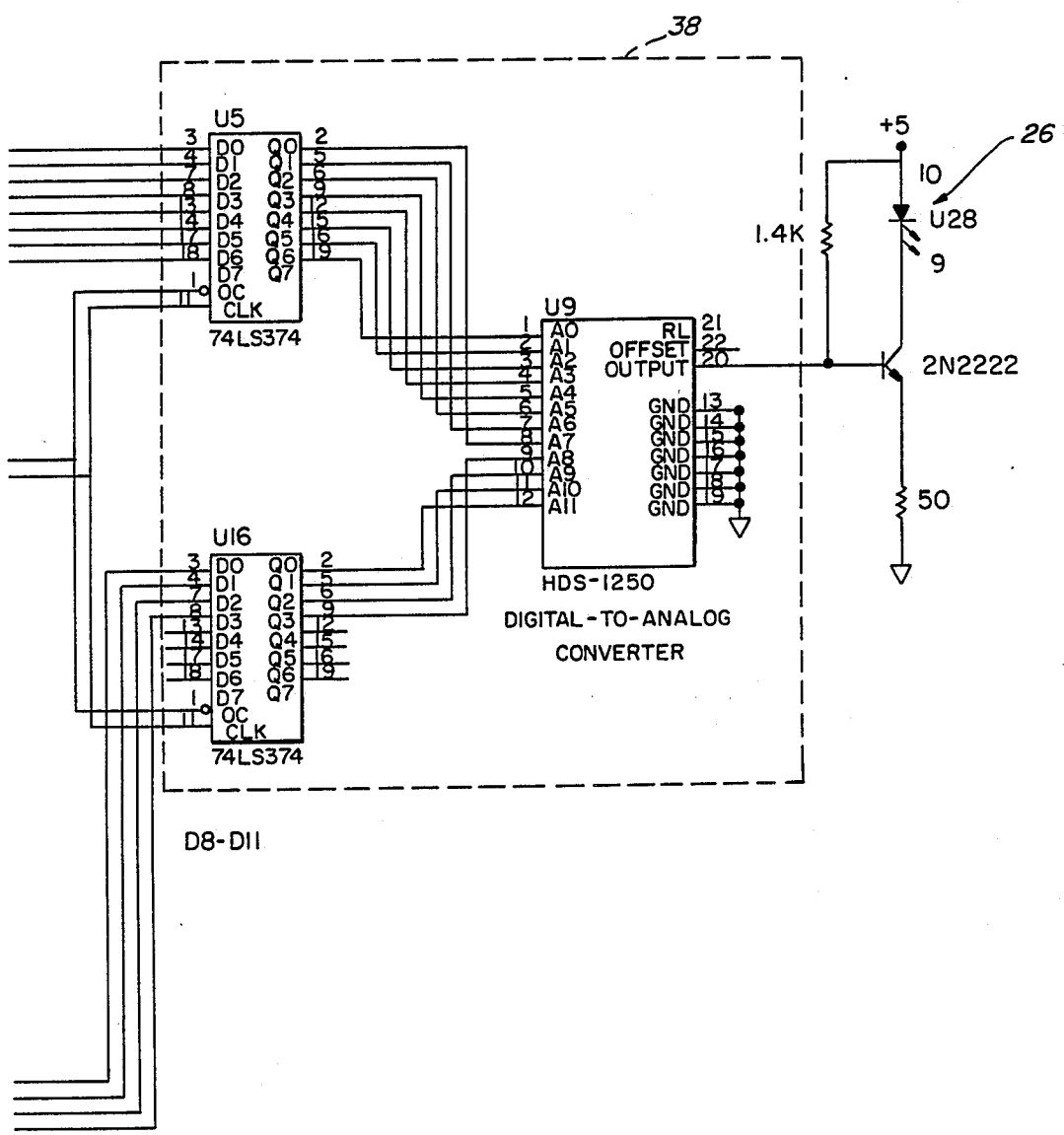

Optical pulses from detector 22 are coupled to address selector 35 of the signal generator section via a lead 25. In a broad sense the address selector is a sequential counter. When a pulse is received from the electrooptic interface section a counter in the selector is reset and begins counting an address during each clock cycle. The sequential addressing of all simulated backscatter signature data (preprogrammed data signals) in RAM 37 continues until all data has been accessed. A suitable halt detection circuit 35', see FIG. 6, is included in the address selector to determine whether the last data in RAM 37 has been addressed. Because there are 2048 kilobytes of data in the RAM, the halt detection circuit tests for an address of 2047 kilobytes. When the address is reached, the clock mode is disabled and counting terminates.

An example of the details and circuit diagrams of the address selector 35 and interconnected RAM 37 as well as the digital-to-analog converter 38 and clock 32 is set forth in FIGS. 6, 7, 8, and 9. These electronic functions are presented in such a clear fashion to apprise one skilled in the art. However, modifications are envisioned to incorporate updated components, and programming techniques without departing from the scope of this inventive concept.

The digital-to-analog (D/A) converter 38 functions in a well known manner to translate digital data signals coming from RAM 37 in the form of a digital code that corresponds to an analog simulated waveform output. Because the number of distinct outputs, m, are a function of the inputs, n, ($m = 2^n$ Nyquist sampling rate), it is readily seen that a larger n will produce a finer resolution. A 12 bit d/a has been used satisfactorily although a greater or lesser bit capability could be included where it would desirable or felt to be necessary in some waveform simulations without departing from the scope of this concept.

As depicted in FIGS. 6 through 9, RAM 37 is appropriately coupled to address selector 35 and microprocessor section 40. The RAM and its interconnections were selected for this function because of the capability for fast access of data that is representative of a simulated backscatter signal and the 12 bit storing capability to assure truly representative simulated waveforms.

The size of the RAM selected for demonstration of this inventive concept is 4K by 12 bits and is made up of three 4K by 4 bit RAMS. As mentioned before the RAM is broken into two banks. Bank 0 stores the low 8 data bits and bank 1 stores the high 4 data bits. The banks are important only during power up, for during this time the high order address lines are decoded and data is placed into their proper banks. After all data has been transferred, RAM 37 is set to the read mode and is ready for data retrieval. After each data is retrieved, it is sent to D/A 38 for processing.

Microprocessor section 40 provides the data representative of the desired simulated backscatter waveforms for the calibration or monitoring of OTDR 15. The microprocessor section selected is a MDX-CPU-4 marketed by United Technologies MOSTEK. A Z80A Bus compatible single board computer 42 has an RS232 serial port 45 as well as an erasable programmable read only memory (EPROM) 46. The microprocessor section thereby presents a readily fabricated and tested CPU and defines a bus structure for accommodating the associated components.

The EPROM provides the instructions for RAM 37 over an address bus 40a and the necessary digital bits over a data bus 40b. In accordance with the program preset in EPROM 46 data bits of a simulated backscatter waveform are fed from board 42 over data bus 40b to RAM 37 in signal generator section 30.

In other words, after reset and when the program in EPROM 46 is run, the EPROM will configure the OFBSG and down load a stored waveform, as pre-established in EPROM 46, to RAM 37. After this down loading has occurred, microprocessor section is appropriately designed to halt, or, if desired, it can be designed to repeat the waveform data in a series or at intervals or whatever sequence that is needed for a particular test application. The design flexibility of this concept allows one skilled in the art to modify the program and some of the hardware to accommodate serial communications that rely on a down loading of a waveform from a data source such as a computer 50, for example.

In operation, any one of a multitude of appropriate signal sequences can be commanded from an appropriately programed EPROM 46 in accordance with techniques well established by truth tables and long practiced programming techniques by those skilled in the art to which this invention pertains. For example, a typical programming technique that is intended as being demonstrative only and not limiting of this inventive concept is shown in the Appendix for the EPROM noted. This program in conjunction with the selected EPROM 46 provided an identical simulated waveform representative of a virtual cable that was coupled to three different OTDRs to provide the waveforms shown in FIGS. 10, 11, and 12.

An OFBSG has been fabricated to have a 20 MHz with 2,048 data points over an optical dynamic range of 20 dB. A peak input optical power of 10 mW in various programmable waveform signatures in EPROM 46 was included to give a designer considerable latitude in the testing of OTDRs. RS232 circuit 45 is provided with an input/output port 40c to facilitate interconnection to a computer 50 as referred to above.

As a consequence of the flexibility inherent in this concept, the data collected so far has demonstrated a great versatility of the OFBSG. This flexibility of the OFBSG has been demonstrated with several commercially available OTDRs that each receive a unique signature and which was recorded in a computer.

Figure 10:
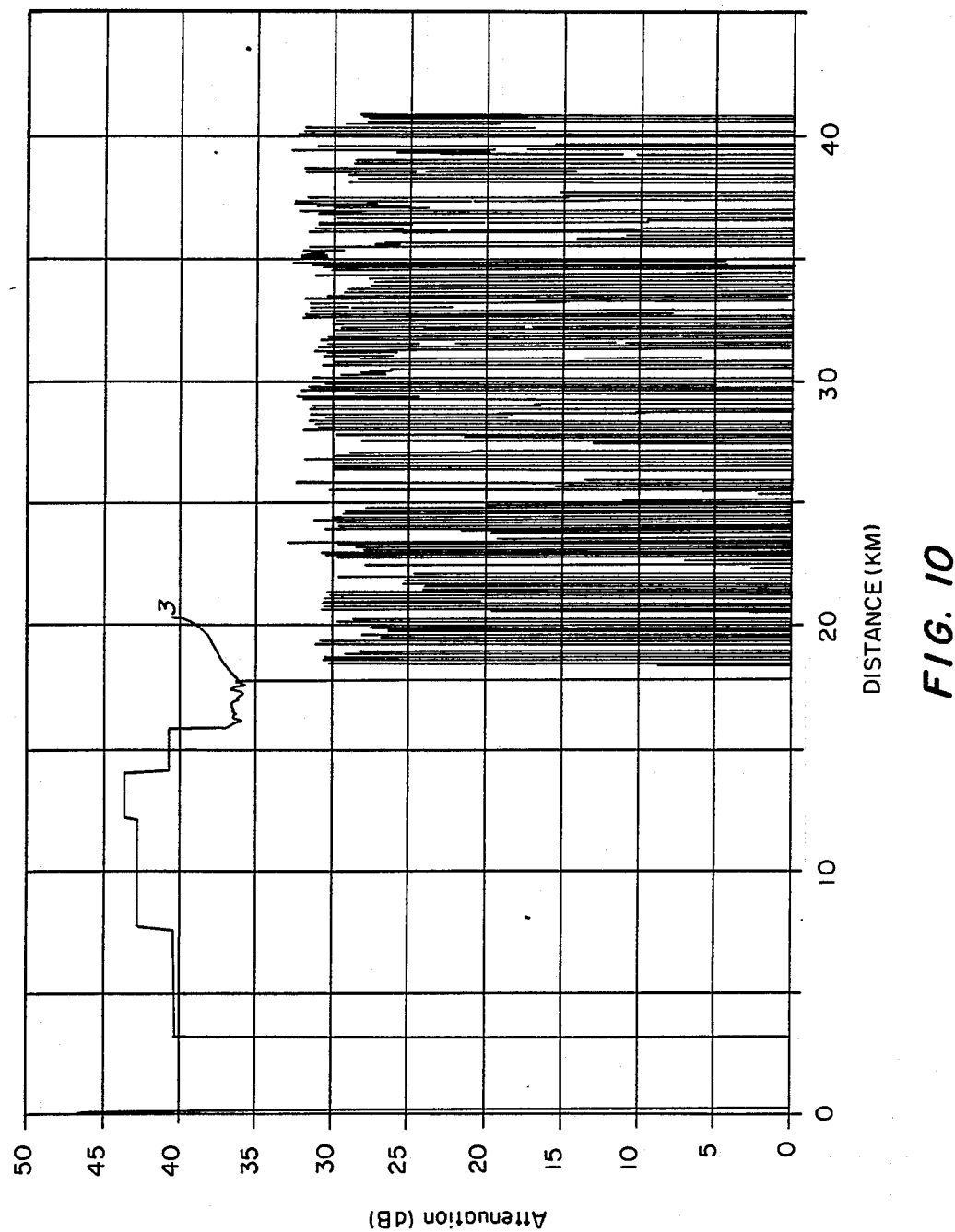
FIG. 10 depicts test data from a commercially available OTDR.
Figure 11:
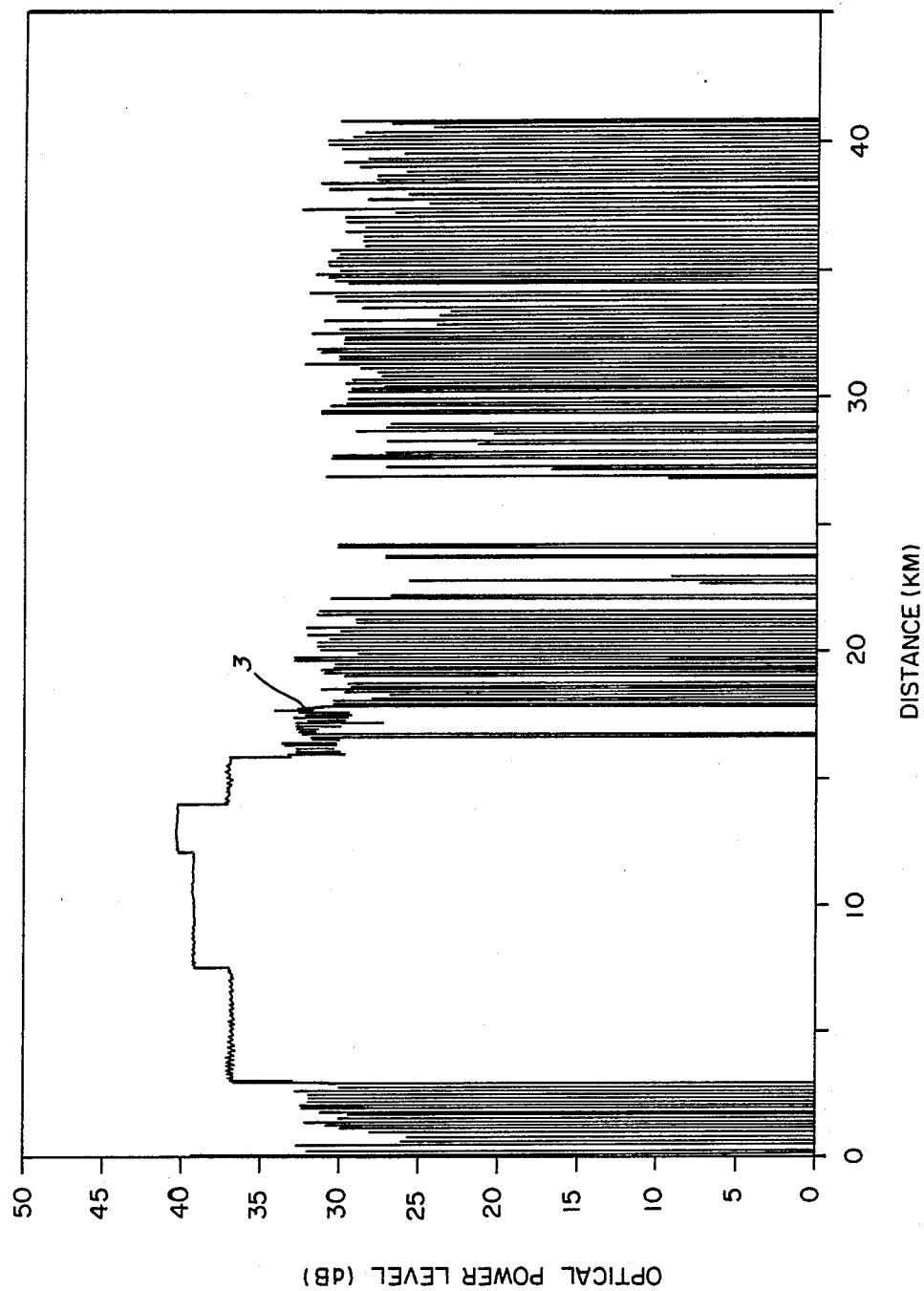
FIG. 11 shows test data from another commercially available OTDR.
Figure 12:
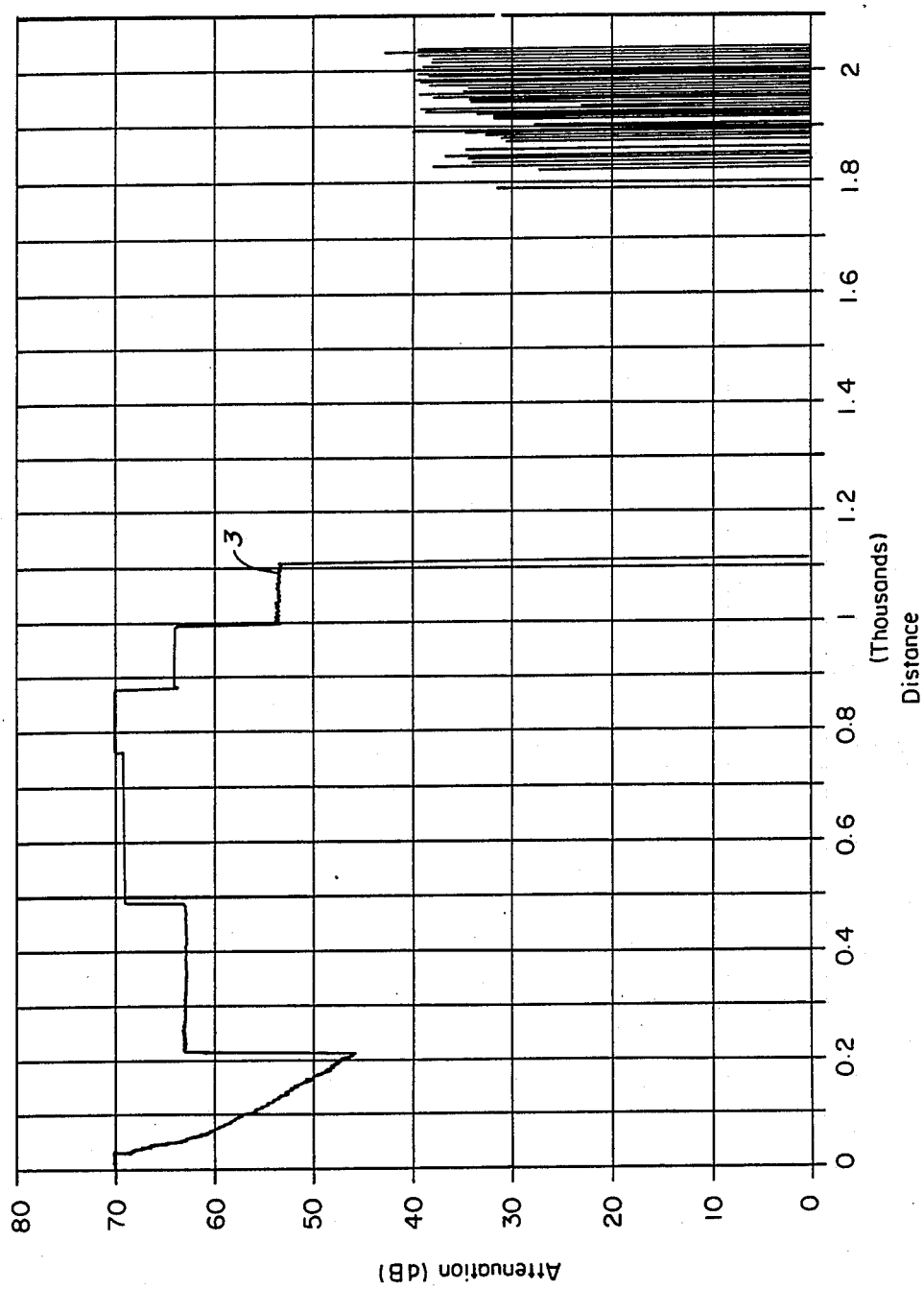
FIG. 12 is yet another showing of test data from a commercial OTDR.

Data taken of three OTDRs, an Anritsu MW910, and Anritsu MW98A and an Ando, is graphically displayed in FIGS. 10, 11 and 12. Although an identical simulated waveform was generated that was representative of a similar cable length and fed to the three OTDRs, from the data shown in the three Figs., the cable losses are represented as being quite different. At a position 3 in FIGS. 10, 11 and 12, attenuation differences readily can be seen. Technicians or designers relying on the data from the three OTDRs might take completely different actions that could be far from what is actually needed.

At this point, however, it should be pointed out that, although the OTDRs show different readings from each other, this does not intend to infer disparagingly about any of the OTDRs under test. In the history of any or all of the OTDRs under test they could have been subjected to varying degrees of abuse or could have been damaged or been exposed to other external occurrences that might have caused the different data indications. The conclusion that is hoped to be brought out by the data of FIGS. 10, 11 and 12 is that the OFBSG has been able to detect that at least one of the OTDRs is performing inconsistently or inaccurately.

The OFBSG of this invention has provided a test device which can be upgraded with upgraded instructions to EPROM 46 to accommodate the various types of OTDRs now on the market and those which may come into being in the future. Waveforms that have passed the length of multi-mode and single-mode fibers can be portrayed with great flexibility and splice loss magnitudes and their locations, as well as other desired anomalies, can be established or changed easily by routinely reprogramming the microprocessor section. The OFBSG also can be implemented for automatic testing of OTDRs through the development of software and suitable interface functioning as microprocessor section 40.

Optionally, and within the scope of this inventive concept, the microprocessor, look-up table and digital-to-analog converter are replaced by a pair of one shot and multiplexor integrated circuits. This composite circuit could be programmed for one or more splices or any number of microbends, elaboration on the specifics of the design is not gone into at this time since, having in mind the concept expressed above, one skilled in the art to which this invention pertains could routinely fabricate such a capability without undue experimentation.

Obviously many modifications and variations of the present invention are possible in the light of the above teachings. It is therefore to be understood that within the scope of the appended claims the invention may be practiced otherwise than as specifically described.

What is claimed is:

1. An apparatus for generating simulated optical fiber backscatter waveform signals to measure the performance of an OTDR comprising:
   an electro-optic interface section means coupled to the OTDR to receive optical signals therefrom for converting them into representative electrical signals and for converting simulated electrical waveform signals into representative said simulated optical fiber backscatter waveform signals for the OTDR;
   a microprocessor section means for providing preprogrammed data signals representative of said simulated optical fiber backscatter waveform signals in a virtual cable; and
   a signal generator section means coupled to the electro-optic interface section means and the microprocessor section means for generating said simulated electrical waveform signals in response to said representative electrical signals and said preprogrammed data signals to feed said simulated electrical waveform signals to said electro-optic interface section means to assure that said simulated optical backscatter waveform signals are fed to the OTDR.

2. An apparatus according to claim 1 in which said electro-optic interface section means includes a 3 dB coupler, pulse detector and LED appropriately interconnected to transmit said optical signals from the OTDR to said pulse detector where said representative electrical signals are converted and said LED is appropriately interconnected to convert said simulated electrical waveform signals into representative said simulated optical fiber backscatter waveform signals.

3. An apparatus according to claim 2 in which the signal generator section includes a clock coupled to receive and be actuated by said representative electrical signals, a RAM coupled to said microprocessor section means to provide a fast access of said preprogrammed data signals, an address selector including a halt detection circuit responsive to said representative electrical signals and said preprogrammed data signals to determine if the last data in RAM has been addressed, and a digital-to-analog circuit operatively interconnected to provide said simulated electrical waveform signals therefrom.

4. An apparatus according to claim 3 in which said microprocessor section means includes an EPROM that is suitably preprogrammed to create said preprogrammed data signals and the generation of said simulated optical fiber backscatter waveform signals in accordance with said preprogrammed data signals.

* * * * *